United States Patent
Ryu

(10) Patent No.: US 7,245,943 B2
(45) Date of Patent: Jul. 17, 2007

(54) APPARATUS AND METHOD FOR INPUTTING CHARACTERS IN A MOBILE COMMUNICATION TERMINAL

(75) Inventor: Shin-Dong Ryu, Daejeon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 133 days.

(21) Appl. No.: 11/092,723

(22) Filed: Mar. 30, 2005

(65) Prior Publication Data
US 2006/0111152 A1   May 25, 2006

(30) Foreign Application Priority Data
Nov. 22, 2004   (KR) ...................... 10-2004-0095737

(51) Int. Cl.
*H04M 1/00* (2006.01)

(52) U.S. Cl. .................. 455/566; 345/161; 345/168; 345/160; 345/156; 341/20; 341/22

(58) Field of Classification Search ................ 455/566; 345/160, 161, 168; 341/120, 22
See application file for complete search history.

(56) References Cited

U.S. PATENT DOCUMENTS 5,543,818 A * 8/1996 Scott ........................... 345/168
6,459,390 B1 * 10/2002 Kim ............................. 341/20
6,567,072 B2 * 5/2003 Watanabe .................... 345/161
2002/0063687 A1 * 5/2002 Kim ............................. 345/160
2003/0169188 A1 * 9/2003 Chang ......................... 341/22

FOREIGN PATENT DOCUMENTS

KR   2004-0025252   3/2004

* cited by examiner

*Primary Examiner*—Joseph Feild
*Assistant Examiner*—David Q. Nguyen
(74) *Attorney, Agent, or Firm*—Roylance, Abrams, Berdo & Goodman, L.L.P.

(57) ABSTRACT

An apparatus and method are provided for inputting a character in a mobile communication terminal which displays character items representing types of characters on a screen of the mobile communication terminal in order for a user to select a type of character to be input in a character input mode. The apparatus and method comprise mapping each of the character items to each of predetermined keys included in a keypad and displaying mapped items, when the mobile communication terminal enters the character input mode; and setting predetermined characters to be display characters for displaying on the screen when a predetermined key signal is input while a preset key signal is input, the predetermined characters being included in a character item corresponding to the predetermined key signal, the predetermined key signal corresponding to one of the displayed character items.

14 Claims, 4 Drawing Sheets

APPARATUS AND METHOD FOR INPUTTING CHARACTERS IN A MOBILE COMMUNICATION TERMINAL

PRIORITY

This application claims the benefit under 35 U.S.C. 119(a) of an application entitled "Method for Inputting Character in Mobile Communication Terminal" filed in the Korean Intellectual Property Office on Nov. 22, 2004 and assigned Serial No. 2004-95737, the entire contents of which are incorporated herein by reference.

BACKGROUND OF THE INVENTION

1. Field of the Invention

The present invention relates to an apparatus and method for inputting characters in a mobile communication terminal. More particularly, the present invention relates to an apparatus and method for enabling the user to easily select character items (which are displayed so that the user may select a type of character to be input by the user) and to efficiently input characters in a character input mode of the mobile communication terminal.

2. Description of the Related Art

In general, a mobile communication terminal includes a cellular phone, a personal Digital Assistant (PDA), a Personal Communication Services Phone (PCS), an International Mobile Telecommunication-2000 (IMT-2000) terminal, a Global System for Mobile Communication (GSM) terminal, and so on, which refer to apparatuses capable of providing a communication function (such as communication or data exchange) while in motion.

Such mobile communication apparatuses are now commonly used by all types of people (of all ages and walks of life) throughout the world, and are recognized by people as an indispensable tool which must always be carried on their person. In consideration of portability, designs of such mobile communication apparatuses have tended not only toward compactness, slimness and lightness, but also toward multimedia availability, having a wider variety of functions.

In particular, future mobile communication apparatuses are expected to incorporate greater multi-functionality and multi-purpose utilization, as well as greater compactness and lightness, and also will be modified to be suitable for various multimedia environments or Internet environments.

Meanwhile, while the mobile communication terminal is used to perform a communication function such as a voice call, the mobile communication terminal also provides various supplementary functions, such as a short message transmission/reception function, a memory function for storing and searching for phone numbers, automatic calling/answering functions, a current time and day-of-the-week display function, an automatic power-off function, an emergency dial function, a locking function, an alarm function, a local-number confirmation function, a melody input function, and a calculator function for performing the four mathematical operations, in addition to the voice communication function.

In general, a mobile communication terminal providing a short message transmission/reception function enters a message input mode by key input of the user (generally by entry through a menu key). In particular, the mobile communication terminal displays the types of characters (such as character items representing Korean characters, English upper case characters, English lower case characters and special characters) so that the user may select the type of character to be input in the message input mode.

Therefore, in a case in which the user wants to input Korean characters, when the user moves a cursor to be located at a Korean character item by using the menu key and selects a key, the corresponding Korean character is displayed.

FIGS. 1A to 1C are diagrams illustrating the conventional character input method in a mobile communication terminal.

FIG. 1A shows a screen showing Korean characters of '내 마음' which have been input by a user. In inputting the Korean characters, the user inputs a menu key in the message input mode of the mobile communication terminal, selects 'K' from among items of 'K', 'A', 'a' and 'S' which are located at a lower portion of the screen in the mobile communication terminal, and then inputs the characters of '내 마음' Herein, the 'K' item represents the Korean characters, the 'A' item represents the English capital characters, the 'a' item represents the English lower case characters and the 'S' item represents special characters.

In order to input special characters of '♥ ♥ ♥' on the screen shown in FIG. 1A, when the user of the mobile communication terminal presses the menu key three times to select the item of 'S' and then selects the special character of '♥' three times from among special characters contained in the 'S' item, characters of '내 마음 ♥ ♥ ♥' are displayed on the screen as shown in FIG. 1B.

Then, in order to input the English lower case characters of 'love' on the screen shown in FIG. 1B, when the user presses the menu key three times to select the item of 'a' and then selects keys corresponding to the 'love', characters of '내 마음 ♥ ♥ ♥ love' are displayed on the screen as shown in FIG. 1C.

As described above, according to the conventional character input method, when the user selects an item representing the type of characters to be input by the user, the cursor for selection moves only to the right direction from among the items.

As a result, as described with reference to FIGS. 1A to 1C, when the user wants to input special characters after inputting the Korean characters, the user must press the menu key three times so as to select the item of 'S' representing the special characters. Also, if the user wants to input the English lower case character while inputting the special character, the user must press the menu key three times so as to select the item of 'a' representing the English lower case characters. Therefore, the conventional character input method has problems in that it is cumbersome to move among the items and to repeat key strokes, and thus user-friendliness is degraded.

SUMMARY OF THE INVENTION

Accordingly, the present invention has been made to solve the above-mentioned problems occurring in the prior art, and an object of the present invention is to provide an apparatus and method for easily inputting characters in a character input mode of the mobile communication terminal.

Anther object of the present invention is to provide an apparatus and method for easily enabling a user to select character items and to input characters, in which the character items are displayed to enable the user to select the type of characters to be input while the mobile communication terminal is in the character input mode.

To accomplish these objects, in accordance with one aspect of the present invention, an apparatus and method for inputting a character in a mobile communication terminal which displays character items representing types of characters on a screen of the mobile communication terminal in order for a user to select the type of character to be input in a character input mode are provided. The apparatus and method comprise mapping each of the character items to each of predetermined keys included in a keypad and displaying the mapped items, when the mobile communication terminal enters the character input mode; and setting predetermined characters to be display characters for display on the screen when a predetermined key signal is input while a preset key signal is input, the predetermined characters being included in a character item corresponding to the predetermined key signal, the predetermined key signal corresponding to one of the displayed character items.

Preferably, the apparatus and method further comprise a step of displaying a key signal for character input as a corresponding character from among characters included in the established character item, when the key signal is input by a key operation of the user.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, an embodiment of the present invention will be described with reference to the accompanying drawings. In the following description of the present invention, a detailed description of known functions and configurations incorporated herein will be omitted for conciseness.

Figure 1A:
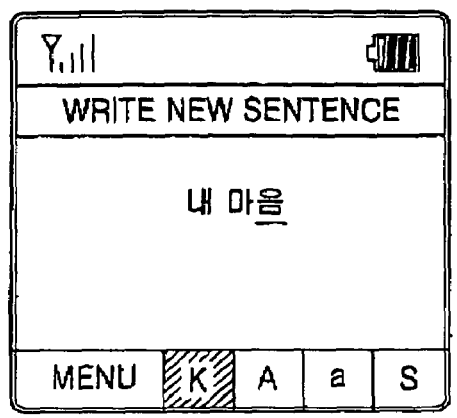
FIGS. 1A to 1C are diagrams illustrating a conventional character input method in a mobile communication terminal.
Figure 1B:
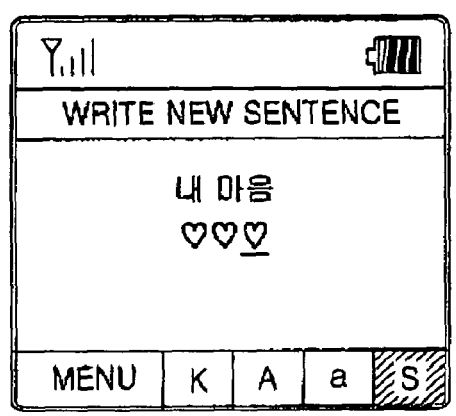
Figure 1C:
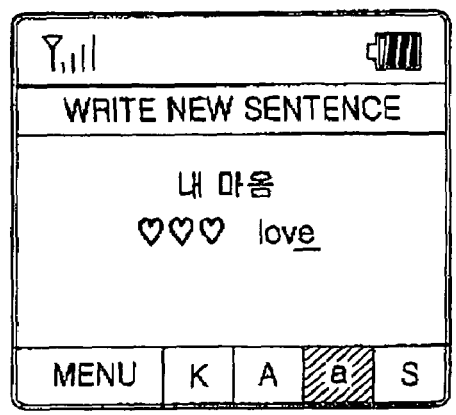
Figure 2:
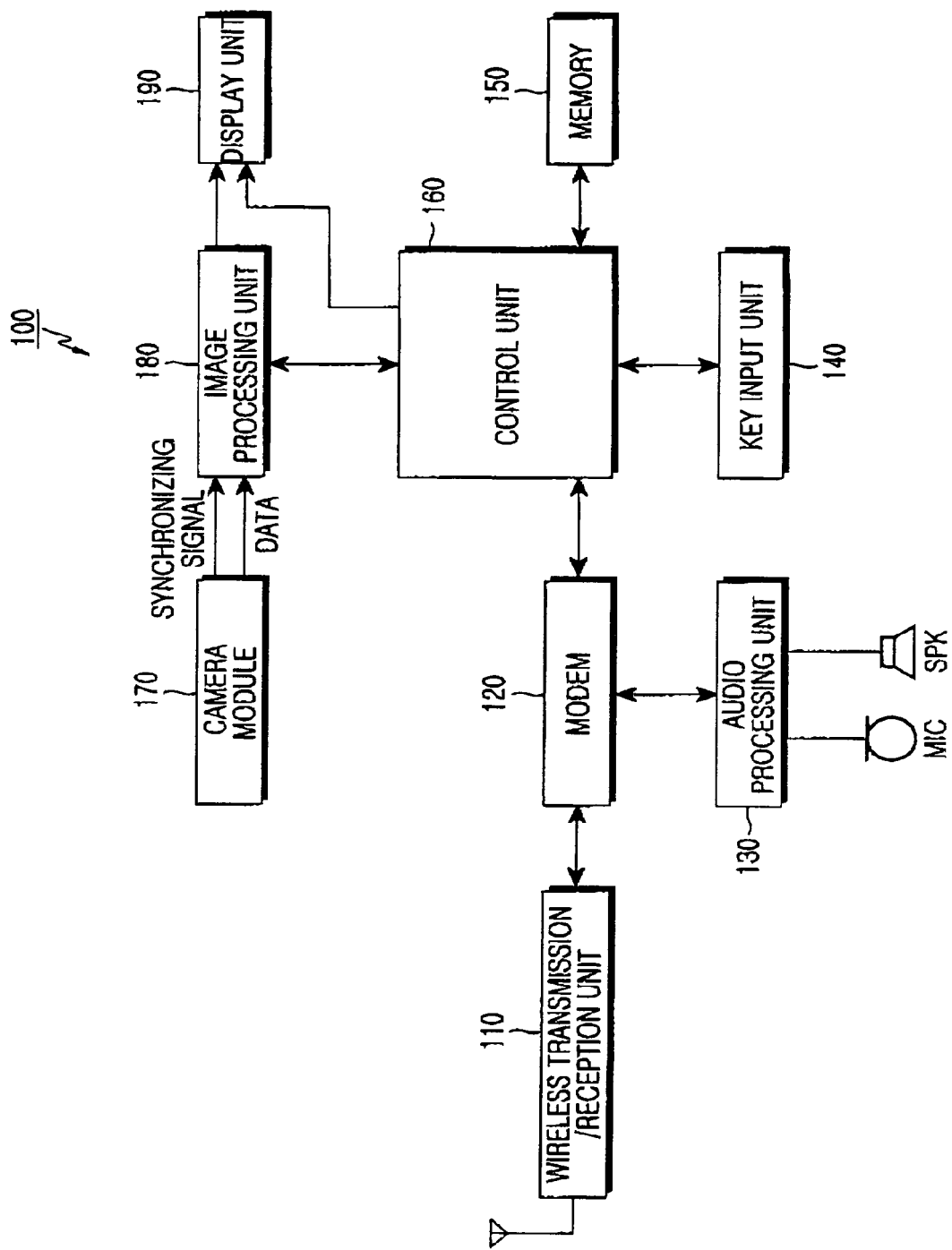
FIG. 2 is a block diagram illustrating a construction of a mobile communication terminal according to an embodiment of the present invention.

FIG. 2 is a block diagram illustrating a construction of a mobile communication terminal according to an embodiment of the present invention.

The mobile communication terminal 100 includes a wireless transmission/reception unit 110, a modem 120, an audio processing unit 130, a key input unit 140, a memory 150, a control unit 160, a camera module 170, a image processing unit 180 and a display unit 190.

The wireless transmission/reception unit 110 transmits/receives voice data, character data, image data and control data under the control of the control unit 160, and includes a radio frequency (RF) transmitter (not shown) for up-converting and amplifying the frequency of a signal to be transmitted and an RF receiver (not shown) for low-noise amplifying a received signal and down-converting the frequency of the received signal.

The modem 120 includes a transmitter for encoding and modulating a signal to be transmitted and a receiver for demodulating and decoding the received signal.

The audio processing unit 130 may include a codec which contains a data codec for processing packet data and the like and an audio codec for processing an audio signal such as voice.

The audio processing unit 130 modulates an electric signal input from a microphone to convert the electric signal into voice data. Also, the audio processing unit 130 decodes encoded voice data input from the wireless transmission/reception unit 110 to convert the voice data into an electrical signal and outputs the electrical signal to a speaker. It is preferred that the audio processing unit 130 may include a codec, which converts and reproduces a digital audio signal received through the wireless transmission/reception unit 110 into an analog signal and converts an analog audio signal generated from the microphone into a digital audio signal. This codec includes a data codec for processing packet data and the like and an audio codec for processing an audio signal such as voice. The codec may be included in the control unit 160.

The key input unit 140 has a key matrix structure (not shown), includes character keys, number keys, various function keys and an exterior volume key, and outputs a key input signal corresponding to a key selected by the user to the control unit 160.

The memory 150 may include a program memory and a data memory, which store various information required to control the operation of the mobile communication terminal 100 according to an embodiment of the present invention and various information selected by the user.

Also, the memory 150 stores Korean characters, English upper case characters, English lower case characters, pictures, diagrams, characters, ruled lines, circle characters, parentheses, and so on, which are used when the user inputs characters in a character input mode in the mobile communication terminal.

The control unit 160 controls an entire operation of the mobile communication terminal according to an embodiment of the present invention.

The camera module 170 obtains image data by photographing an image and includes a camera sensor and a signal processing unit, in which the camera sensor converts an optical signal obtained by photographing into an electrical signal and the signal processing unit converts an analog image signal obtained by the photographing of the camera sensor into digital data.

Herein, it is assumed that the camera sensor is a charge-coupled device (CCD) sensor, and the signal processing unit may be a digital signal processor (DSP). Also, the camera sensor and the signal processing unit may be integrally or separately constructed.

The image processing unit 180 functions to generate screen data for displaying an image signal output from the camera module 170.

The image processing unit 180 processes an image signal (which is output from the camera module 170) in a unit of frame, and outputs the image signal of the frame unit according to the characteristic and the size of the display unit 190. Also, the image processing unit 180 includes a image codec, which compresses the image data of the frame unit (which are displayed on the display unit 190) according to a predetermined scheme and restores compressed image data of the frame unit to original image data of the frame unit.

Also, it is assumed that the image processing unit 180 has an On Screen Display (OSD) function, the image processing unit 180 can output OSD data according to the size of a screen for display under the control of the control unit 160.

The display unit 190 may employ a Liquid Crystal Display (LCD) or the like and displays various display data generated in the mobile communication terminal. When the LCD is realized in a touch screen scheme, the display unit 190 may operate as an input unit.

In addition, the display unit 190 displays an image signal (which is output from the image processing unit 180) and user data (which are output from the control unit 160) on its screen.

Hereinafter, the operation of the mobile communication terminal 100 according to an embodiment of the present invention will be described with reference to FIG. 2.

In the case of an outgoing call, when the mobile communication terminal 100 sets an outgoing mode after the user performs a dialing operation by the key input unit 140, the control unit 160 detects it, processes the dialed information received through the modem 120, converts the dialed information into an RF signal by the wireless transmission/reception unit 110, and then outputs the RF signal. Thereafter, when a called subscriber responds to the RF signal, the mobile communication terminal 100 detects it by the wireless transmission/reception unit 110 and the modem 120. Then, a voice communication route is formed by the audio processing unit 130, so that it becomes possible for the user to communicate.

Also, in the case of an incoming call, the control unit 160 detects an incoming call by the modem 120 and generates a ring signal through the audio processing unit 130. Thereafter, the user responds to the ring signal, the control unit 160 detects it and forms a voice communication route by the audio processing unit 130, so that it becomes possible for the user to communicate.

Although the outgoing and incoming modes are described using voice communication as an example, a data communication function for communicating packet and image data can also be used in the outgoing and incoming modes. Meanwhile, when the mobile communication terminal is in a standby mode or performs character communication, the control unit 160 displays character data processed by the modem 120 on the display unit 190.

Figure 3:
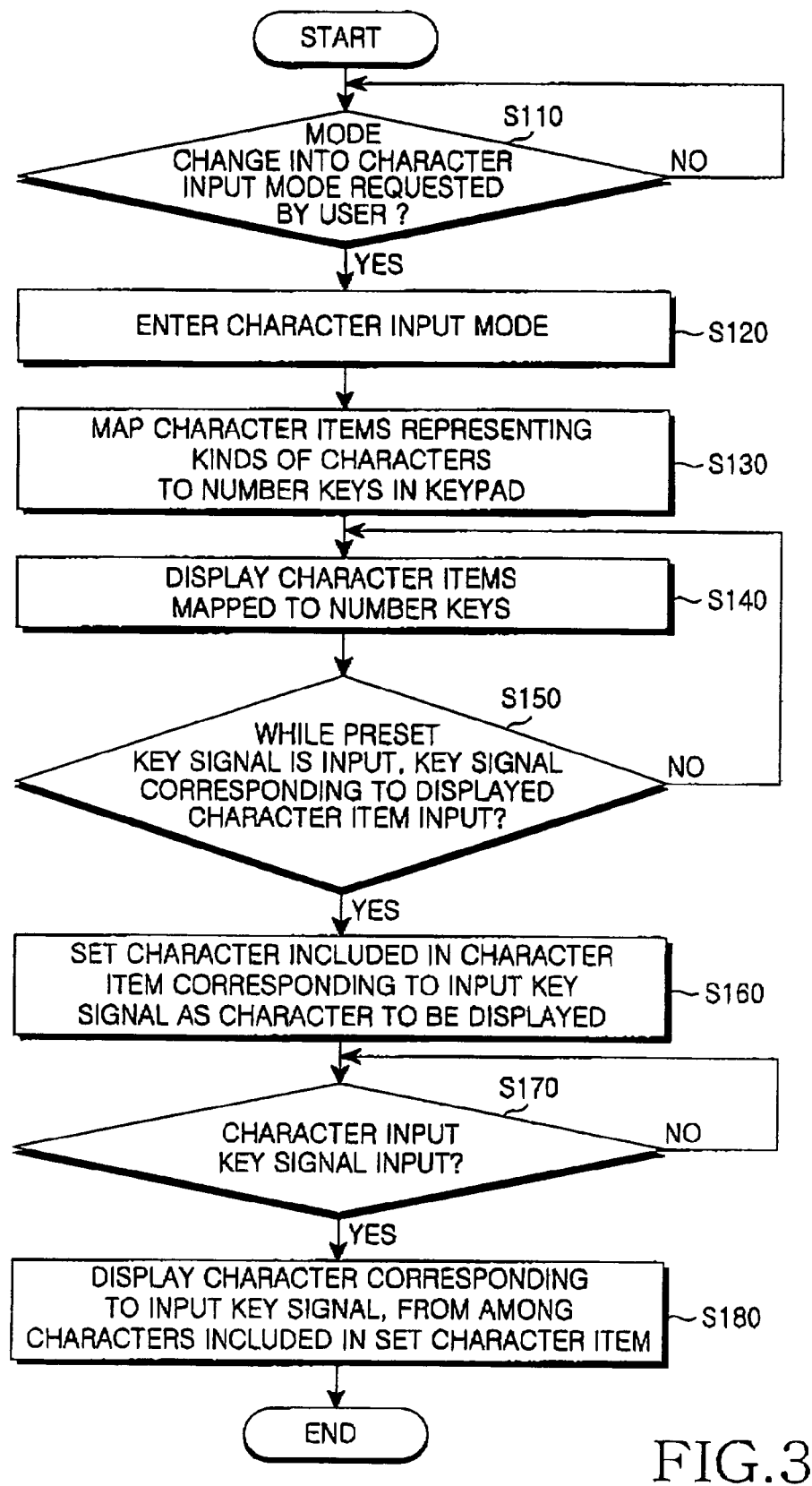
FIG. 3 is a flowchart illustrating a character input procedure in the mobile communication terminal according to an embodiment of the present invention.

FIG. 3 is a flowchart illustrating a character input procedure in the mobile communication terminal according to an embodiment of the present invention.

Referring to FIGS. 2 and 3, in step 110, the control unit 160 checks whether the user requests a mode change for a character input mode. The request for the change into the character input mode may be performed by a voice input or a key input (e.g., by selection of a menu key or by selection of a key set to change a mode into the character input mode).

When the user requests a mode change into the character input mode, the control unit 160 changes the mode of the mobile communication terminal 100 into the character input mode in step 120.

When the mode of the mobile communication terminal 100 changes into the character input mode by request of the user, the control unit 160 maps the character items to predetermined keys (e.g., number keys) contained in the key input unit 140, respectively, in step 130. In this case, the character items include items of Korean characters, English upper case characters, English lower case characters, numbers and special characters.

Figure 4:
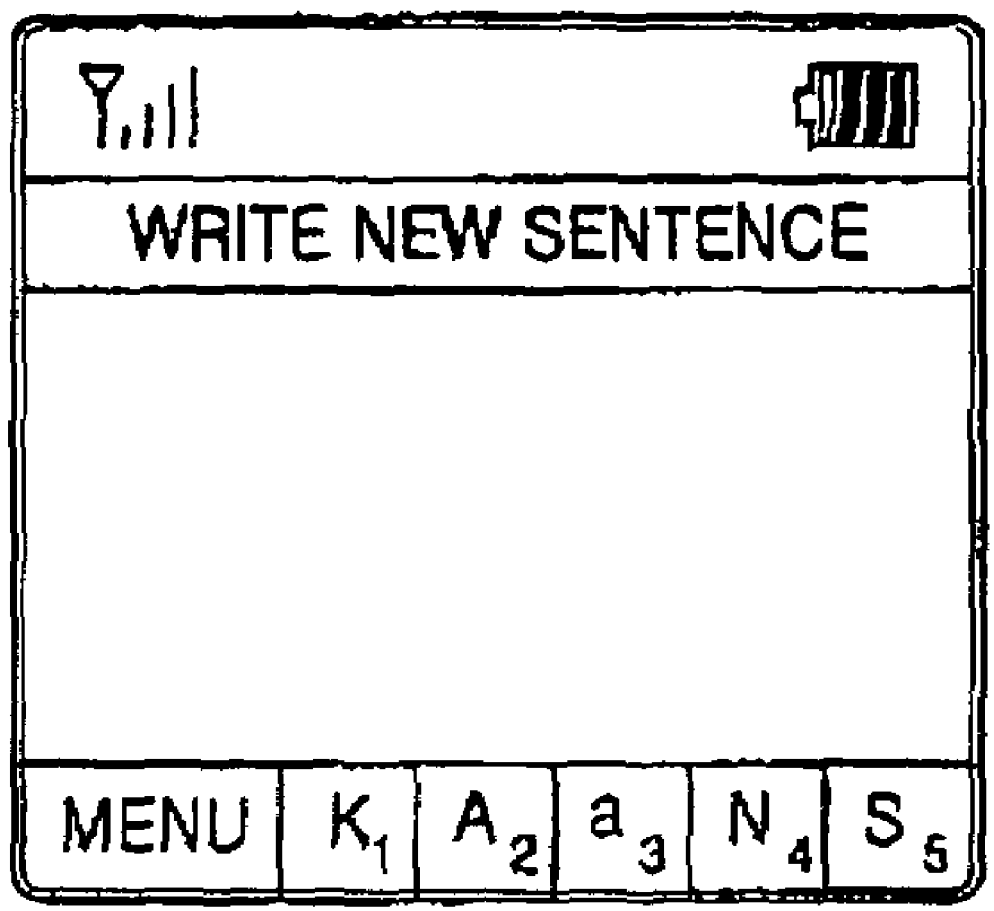
FIG. 4 is a diagram of a screen (display unit) of the mobile communication terminal according to an embodiment of the present invention, for displaying character items representing the types of input characters that are mapped respectively to number keys.

In step 140, the control unit 160 displays the character items mapped respectively to the number keys on the display unit 190. In this case, it is preferred that the character items are displayed on a lower portion of the screen of the display unit 190 as shown in FIG. 4. Referring to FIG. 4, it can be understood that the item of 'K' representing the Korean characters is mapped to number key '1', the item of 'A' representing the English upper case characters is mapped to number key '2', the item of 'a' representing the English lower case characters is mapped to number key '3', the item of 'N' representing numbers is mapped to number key '4', and the item of 'S' representing the special characters is mapped to number key '5'.

In step 150, the control unit 160 checks whether a key signal corresponding to one of the character items (which are mapped respectively to the number keys and displayed on the screen) is input while a preset key signal is input. In this case, the preset key signal refers to a signal of a set key which is preset for selecting one of the items representing the types of characters to be input by the user. One of the keys contained in the key input unit 140 may be established as the preset key, and preferably, the menu key generally-used to select one of the items (which represent the types of characters to be input by the user) is established as the preset key.

When a key signal corresponding to one of the character items is input while the preset key signal is input, the control unit 160 establishes characters (which are contained in the character item corresponding to the input key signal) as characters to be displayed in step 160. That is, when the user presses number key '3' included in the key input unit 140 while pressing the preset key (e.g., the menu key), the control unit 160 performs a control operation in such a manner that all character input key signals input hereafter are displayed as corresponding English lower case characters (a to z) on the screen of the display unit 190.

In step 170, the control unit 160 checks whether a key signal for inputting a character is input by a key operation of the user.

As a result, when a key signal for inputting a character is input, the control unit 160 displays a character corresponding to the input key signal, from among characters included in the character item established in step 160, in step 180. For example, when it is assumed that the user presses number key '3' included in the key input unit 140 while pressing the preset key (e.g., the menu key), the mobile communication terminal 100 displays each character input key signal input hereafter as each corresponding English lower case character (a to z). That is, when the user presses a key corresponding to "a" and a key corresponding to "b" from among English lower case characters, the mobile communication terminal 100 displays "ab" on the screen.

According to an embodiment of the present invention, it is possible to reduce the character input time and repeated key input work by decreasing the number of times of key inputs required for selecting a character item for characters to be input by the user, thereby greatly improving user convenience.

As described above, the embodiment of the present invention enables the user to easily select character items (which are displayed so that the user may select the type of characters to be input by the user) in the character input mode in the mobile communication terminal, so that the user can efficiently input characters.

In addition, the embodiment of the present invention reduces a character input period of time and a repeated key input work by decreasing the number of times of key input required for selecting a character item for characters to be input by the user, thereby greatly improving user convenience.

While the present invention has been shown and described with reference to a certain embodiment thereof, it should be understood by those skilled in the art that various changes in form and details may be made therein without departing from the spirit and scope of the invention as defined by the appended claims. Accordingly, the scope of the invention is not to be limited by the above embodiment but by the claims and the equivalents thereof.

What is claimed is:

1. A method for inputting a character in a mobile communication terminal which displays character items representing types of characters on a screen of the mobile communication terminal in order for a user to select the type of character to be input in a character input mode, the method comprising the steps of:

mapping each of the character items to each of predetermined keys included in a keypad and displaying mapped items, when the mobile communication terminal enters the character input mode; and determining each of sets of predetermined characters to be display characters for displaying on the screen when a predetermined key signal is input by a single key pressing while a preset key signal is input, the predetermined characters being included in a character item corresponding to the predetermined key signal, and the predetermined key signal corresponding to one of the displayed character items.

2. The method as claimed in claim 1, wherein the character items comprise at least two of Korean characters, English upper case characters, English lower case characters, numbers and special characters.

3. The method as claimed in claim 1, wherein the preset key comprises a menu key in the keypad of the mobile communication terminal.

4. The method as claimed in claim 1, wherein the display step comprises the steps of:

changing a mode of the mobile communication terminal into the character input mode;

mapping the character items for selection to number keys in the keypad, respectively; and displaying the mapped character items in a lower portion of the screen of the mobile communication terminal.

5. The method as claimed in claim 1, further comprising displaying a key signal for character input as a corresponding character from among characters comprising the established character item, when the key signal is input.

6. The method as claimed in claim 1, wherein the character input mode is entered via a user request.

7. The method as claimed in claim 1, wherein the key signal is input via a key operation of a user.

8. An apparatus for inputting a character in a mobile communication terminal which displays character items representing types of characters on a screen of the mobile communication terminal in order for a user to select the type of character to be input in a character input mode, comprising:

a memory for storing the characters;

a keypad for selecting the characters; and a controller for mapping each of the character items to each of predetermined keys included in the keypad and displaying mapped items, when the mobile communication terminal enters the character input mode, and determining each of sets of predetermined characters to be display characters for displaying on the screen when a predetermined key signal is input while a preset key signal is input by a single key pressing, the predetermined characters being included in a character item corresponding to the predetermined key signal, and the predetermined key signal corresponding to one of the displayed character items.

9. The apparatus as claimed in claim 8, wherein the character items comprise at least two of Korean characters, English upper case characters, English lower case characters, numbers and special characters.

10. The apparatus as claimed in claim 8, wherein the preset key comprises a menu key in the keypad of the mobile communication terminal.

11. The apparatus as claimed in claim 8, wherein the controller changes a mode of the mobile communication terminal into the character input mode, maps the character items for selection to number keys in the keypad, respectively, and displaying the mapped character items in a lower portion of the screen of the mobile communication terminal.

12. The apparatus as claimed in claim 8, wherein the controller further displays a key signal for character input as a corresponding character from among characters comprising the established character item, when the key signal is input.

13. The apparatus as claimed in claim 8, wherein the character input mode is entered via a user request.

14. The apparatus as claimed in claim 8, wherein the key signal is input via a key operation of a user.

* * * * *